United States Patent [19]

Wolf et al.

[11] 3,991,015

[45] Nov. 9, 1976

[54] HIGH MOLECULAR WEIGHT COPOLYAMIDES CONTAINING QUINAZOLINE DIONE UNITS

[75] Inventors: Gerhard Dieter Wolf; Hans Egon Künzel, both of Dormagen; Günther Blankenstein, Stommeln; Peter Kleinschmidt, Dormagen; Francis Bentz, Cologne, all of Germany

[73] Assignee: Bayer Aktiengesellschaft, Leverkusen, Germany

[22] Filed: May 3, 1974

[21] Appl. No.: 466,842

Related U.S. Application Data

[63] Continuation-in-part of Ser. No. 361,527, May 18, 1973, abandoned.

[52] U.S. Cl. .............................. 260/47 CZ; 260/49; 260/50; 260/65; 260/78 R; 260/256.4 Q
[51] Int. Cl.² .................. C08G 69/26; C08G 69/40
[58] Field of Search ................. 260/256.4 Q, 47 CZ, 260/78 R, 65, 49, 50, 63 R

[56] References Cited
UNITED STATES PATENTS 3,527,732  9/1970  Wolf et al. ............................ 260/47
3,671,614  6/1972  Kunzel et al. ......................... 260/47

Primary Examiner—Lester L. Lee
Attorney, Agent, or Firm—Plumley and Tyner

[57] ABSTRACT

High molecular weight aromatic copolyamides which contain a small proportion of structural units having 2,3-(1H,3H)-quinazoline dione rings are disclosed. The presence of quinazolinedione ring units in the copolyamide results in an increased moisture absorption capacity. By using small amounts of quinazoline dione units, the good physical properties of the corresponding quinazoline dione-free polyamide are substantially retained while the moisture absorption is significantly increased. Larger amounts of quinazoline dione units than contemplated (15 mol percent and more) do not improve the moisture absorption further and adversely affect the physical properties. The copolyamides are useful in textile applications in which the improved moisture absorption serves to make clothing prepared from such textiles more comfortable.

10 Claims, No Drawings

HIGH MOLECULAR WEIGHT COPOLYAMIDES CONTAINING QUINAZOLINE DIONE UNITS

This application is a continuation-in-part of our copending application, Ser. No. 361,527, filed May 18, 1973 now abandoned.

This invention relates to aromatic copolyamides which contain a small proportion of co-condensed units containing 2,3(1H,3H)-quinazoline dione rings.

It is known that fully aromatic polyamides, which generally have good thermal properties and are comparatively incombustible, have only a limited capacity for absorbing and retaining water. The moisture absorption capacity (at 65% relative humidity and 21°C) of poly-m-phenylene-isophthalamide is given as 4.5%. One of the factors which makes textiles comfortable to wear is a good water absorption capacity of the fibers used. It is therefore desirable that fully aromatic polyamides which are used in textile applications, for example as protective clothing against heat, fire, acids and alkalies (underwear, socks, gloves, anoraks, suits and uniforms), should have a high moisture absorption capacity in order that they should be comfortable to wear. A moisture absorption capacity of 9% or more is considered desirable for wear comfort.

Compared with the corresponding fully aromatic polyamides without 2,4(1H, 3H)-quinazoline dione units, the copolyamides of this invention containing 2,4(1H,3H)-quinazoline dione units are distinguished by higher moisture absorption and substantially improved solubility in polar organic solvents, which is an advantage in the production of threads and fibers.

Quinazoline dione containing copolyamides are described in German Offenlegungsschrift 1,953,358, the specific embodiments of which relate to copolyamides containing relatively high amounts of quinazoline dione units compared to the copolyamides of this invention. However, it has been unexpectedly found that the quinazoline dione content of the German Offenlegungsschrift can be advantageously reduced to obtain copolyamides which have a better moisture absorption, higher crystallinity and therefore better physical properties, and which are more economically to produce because of the lower proportion of the expensive quinazoline dione component.

Accordingly, this invention relates to copolyamides containing less than 15 mol percent of 2,4 (1H,3H)-quinazoline dione units but sufficient to produce a copolyamide having a moisture absorption of at least 9%. It is also preferred that the amount of 2,4 (1H,3H)-quinazoline dione units be such that a detectable amount of crystallinity, characteristic of the corresponding homopolymer, be retained. The exact molar proportions of copolyamide components necessary to achieve these objectives varies somewhat with the chemical structure of the copolyamide components but in any case, the copolyamide comprises less than 15% mol percent of 2,4 (1H,3H)-quinazoline dione units, generally in the range of 1–12 mol percent. Usually, at least about 5 mol percent of 2,4 (1H,3H)-quinzaoline dione is needed to provide the desired moisture absorption of 9%. Preferably, about 5–9.5 mol percent of 2,4 (1H,3H)-quinazoline dione units are used and most preferably, 5–9 mol percent.

Crystallinity can be determined from X-ray wide-angle diagrams as in H. P. Klug and L. E. Alexander, X-Ray Diffraction Procedures, J. Wiley and Sons, 6 Printing, 1970.

The copolyamides which have the highest moisture absorption capacity coupled with the good physical properties associated with crystallinity are those in which only a small proportion of the diamine component, namely 1–9 mol percent and preferably 5–9 mol percent, is replaced by quinazoline dione amine residues.

This invention therefore relates to high molecular weight aromatic copolyamides having a moisture absorption of at least 9% and less than 15 mol percent of structural units which contain 2,4-(1H,3H)-quinazoline dione ring systems, said structural units are represented by the following general formula

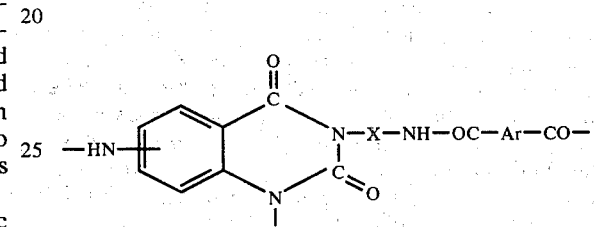

in which

R represents a hydrogen atom or a $C_1$ to $C_4$ alkyl group,

X represents a divalent aromatic group which consists of one or more condensed or of several aromatic rings which are linked together, by single bonds or by bridge members such as —O—, —S—, —$SO_2$—,

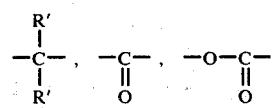

or —HN—$SO_2$, or the halogen, $C_1$ to $C_4$-alkyl, $NO_2$— or CN— substitution products of such a divalent aromatic group, R' represents R, cycloalkyl, a substituted or unsubstituted phenyl group, and Ar represents a divalent aromatic groups which consists of one or more condensed or of several aromatic rings which are linked together by single bonds or by bridge members such as —O—, —S—, —$SO_2$—,

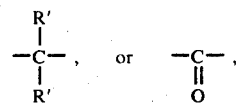

and the halogen, $C_1$ to $C_4$-alkyl, $NO_2$ or CN substitution products of such a divalent aromatic group, and at least 85 mol % of structural units of the general formula —HN—Ar'—NH—OC—Ar—CO—     II in which
Ar has the meaning indicated above and
Ar' has the meaning indicated for X, said copolyamides having a relative solution viscosity $\eta_{rel.}$ (determined on a 0.5% solution of the copolyamide in concentrated sulphuric acid at 25° C) of 1.2 – 2.5.

The copolyamides according to the invention are therefore made up of 3 components:

The first component consists of one or more fully aromatic diamines corresponding to the general formula $H_2N—Ar'—NH_2$     V in which Ar' has the meaning indicated above.

The following are examples of such diamines: m-phenylenediamine, p-phenylenediamine, 4,4'-diaminodiphenylether, 4,4'-diaminodiphenylsulphide, 2,6-diaminonaphthalene, 2,7-diaminonaphthalene, benzidine, 4,4'-diaminodiphenylmethane, 4,4'-diaminodiphenylsulphone, 3,3'-diaminobenzophenone, 1,4-bis-(p-aminophenoxy)-benzene, and 4,4'-bis-(p-aminophenoxy)-diphenylsulphone.

The second component consists of one or more diamines which correspond to the general formula

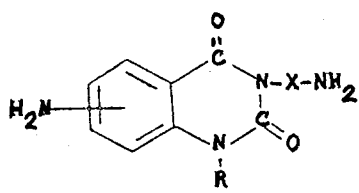

IV in which R represents hydrogen or a $C_1$ to $C_4$ alkyl group and X is a divalent aromatic group which has the meaning defined above.

The following are examples of such diamines:

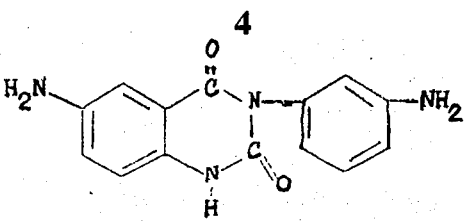

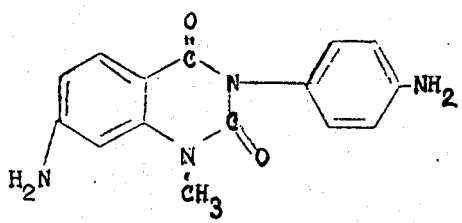

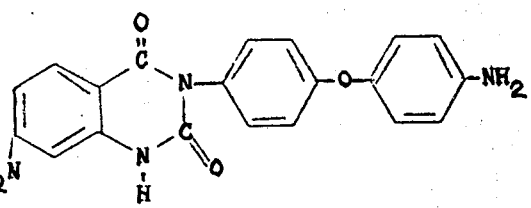

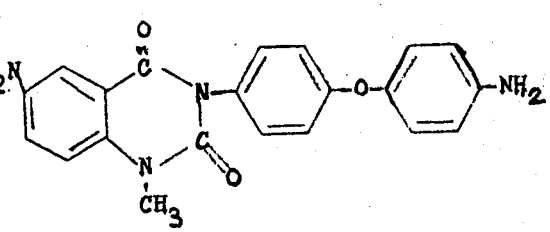

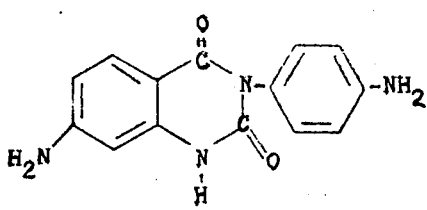

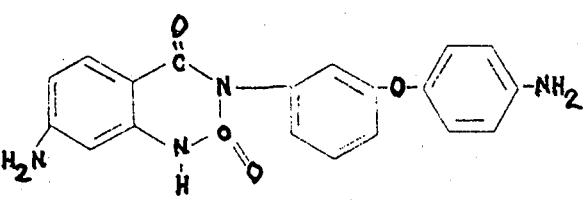

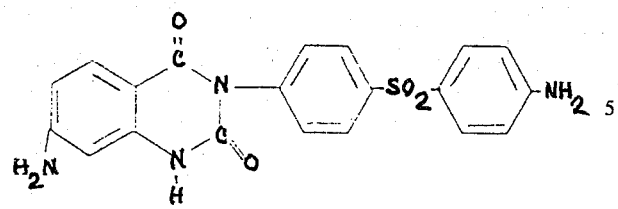

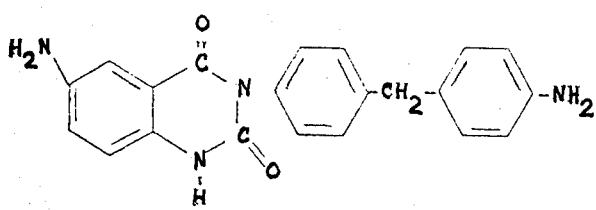

These diamines are added in amounts of 1–12 mol percent preferably 5–9 mols %, based on the total quantity of the diamines used, in order to increase substantially the hydrophilic character of the aromatic polyamides.

These diamines which contain 2,4-quinazoline dione ring systems may be prepared according to an earlier proposal of the present applicants, for example by reaction of 4- or 5-nitroanthranilic acid esters with aromatic isocyanates which contain a nitro group and ring closure of the resulting urea derivatives in a 20 : 1 mixture of o-dichlorobenzene/pyridine, followed by reduction of the nitro groups. The same diamines which contain 2,4-quinazoline dione ring systems may also be obtained by a modified process, for example by reaction of 4- or 5-nitroanthranilic acid with aromatic isocyanates which contain a nitro group and ring closure of the o-ureidobenzoic acids formed as intermediate products to convert them into N-methylpyrrolidone in the presence of P₂O₅ or e.g. in dimethylformamide with the aid of phosgene, followed by catalytic reduction of the nitro groups.

The third component consists of aromatic dicarboxylic acid dihalides of the general formula Hal-OC-Ar-CO-Hal,                  III in which Hal denotes Cl or Br and Ar has the meaning indicated above. The following are examples of such dicarboxylic acid dihalides: isophthalic acid dichloride, terephthalic acid dichloride, diphenyl-4,4'-dicarboxylic acid dichloride, naphthalene-1,5-dicarboxylic acid dichloride, naphthalene-2,6-dicarboxylic acid dichloride, diphenylether-4,4'-dicarboxylic acid dichloride, diphenylsulphone-4,4'-dicarboxylic acid dichloride, benzophenone-4,4'-dicarboxylic acid dichloride and the corresponding dibromides as well as alkyl substitution and halogen substitution products of the given acid dihalides.

Polycondensation of the 3 components described above is carried out by known methods such as interfacial polycondensation, but preferably by solution polycondensation in polar organic solvents such as N,N-dialkylcarboxylic acid amides, preferably N,N-dimethylacetamide, or N-alkylsubstituted lactams, preferably N-methylpyrrolidone, or in tetramethylurea or hexamethylphosphoric acid triamine etc., or in mixtures of such polar aprotic solvents without additional acid acceptors but if necessary in the presence of solubilising agents such as alkali metal or alkaline earth metal halides in order to keep the resulting copolyamides in solution. Condensation is carried out at temperatures of between −30° C and 150° C, preferably between −10° C and 30° C. The reaction times may be between 1 and 30 hours. The solids content of the solutions is 5 to 40%, preferably 15 to 25%. In order to obtain very high molecular weight reaction products it is advisable to use equimolar quantities of the diamine component (i.e. the sum of diamines) and the dicarboxylic acid dichloride component although in principle polycondensation may also be carried out with an excess or subequivalent amount of dicarboxylic acid dichloride. The dicarboxylic acid dichloride may be added in several small portions distributed over a period of time to the solution or suspension of the diamines in the solvent. In some cases, however, it is advisable to add the total quantity of dicarboxylic acid dichloride all at once and preferably with cooling.

Copolyamides containing 2,4-(1H,3H)-quinazoline dione rings according to the invention have good thermal and mechanical properties. They can easily be processed and used for the manufacture of films, foils, threads and bristles which have excellent mechanical and thermal properties.

An especially important feature is the substantially increased moisture absorption capacity of the polyamides according to the invention, which renders them particularly suitable for use as fibres for textiles used in the manufacture of protective clothing (underwear, socks, gloves, suits) against fire, heat, acids and alkalies.

The following table shows that copolyamides which contain 5 to 9.5 mols % of quinazoline dione units have a particularly high moisture absorption capacity. The diamine of the following formula

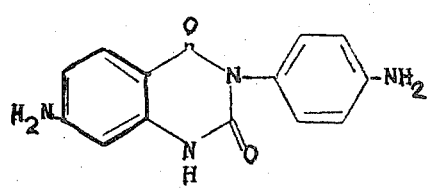

VIII was used for this series of experiments.

| Condensate | H₂O absorption % |
|---|---|
| Poly-m-phenylene isophthalate | 4.5 |
| containing 5–9.5% of quinazoline dione units | 9.5–10.5 |
| containing 20–40% of quinazoline dione units | 8.1–8.6 |

Method of determining the moisture absorption capacity:

The fibres are washed at 30° C, dried and exposed to an atmosphere of 20° C and 65% relative humidity for 24 hours to enable them to take up moisture. The fibres are then dried in a vacuum at 80° C and the moisture absorption is expressed as the equilibrium in percent of the weight of absolutely dry fibres.

The threads may be manufactured by any of the usual methods of dry spinning or wet spinning. The spinning solutions used were preferably polyamide solutions in dimethylacetamide or N-methylpyrrolidone with a polyamide solids content of between 15 and 25%. The concentration of solubilising agent used (if necessary), which was preferably calcium chloride or lithium chloride, was between 3% and 12%. Spinning solutions which had viscosities of between 400 and 1100 poises (determined at 20° C in a rotation viscosimeter) were preferred although solutions with viscosites of up to 2000 poises can easily be spun. The relative viscosity $\eta_{rel.}$ of the copolyamides was between 1.3 and 2.5 but mainly between 1.4 and 1.8 (determined on a 0.5% solution in concentrated sulphuric acid at 20° C).

In cases where the wet spinning process was employed the threads were coagulated in an aqueous precipitation bath at 50° to 60° C and drawn off through a 10 aperture die (aperture diameter 0.1 mm) at the rate of 10 to 15 m/min. In the case of the dry spinning process, the spinning solution was kept at 40° C and extruded through a 72 or 144 aperture die (aperture diameter 0.1 mm) into a spinning shaft charged with hot air at about 200° C and the thread was drawn off at the rate of 100 m/min.

Aftertreatment is essential for the production of threads with good textile properties. Both wet spun and dry spun threads are advantageously first prestretched in boiling water to an extent of between 1 : 1.2 and 1 : 1.5 and then washed in water at 60° C and dried. They are then finally stretched to an extent of between 1 : 1 and 1 : 5 at a temperature of 300° to 350° C.

The ultimate tensile strengths of the stretched threads were between 1.5 and 5.3 g/dtex.

The following Examples are to further illustrate the invention without limiting it.

EXAMPLE 1

98.3 Parts by weight of m-phenylene diamine and 24.1 parts by weight of 3-(p-aminophenyl)-7-amino-2,4-(1H,3H)-quinazoline dione(9 mols %, based on the total quantity of diamine) were introduced into 980 parts by weight of absolute N-methylpyrrolidone. The mixture was then cooled to about −30° C and 203 parts by weight of isophthalic acid dichloride were added all at once. The viscous solution was then stirred for several hours at room temperature. The hydrochloric acid formed in the condensation reaction was neutralised by the addition of 74.1 parts by weight of calcium hydroxide.

This solution was wet spun into an aqueous precipitation bath at 50° to 60° C through a 10 aperture die with an aperture diameter of 0.1 mm. The threads were drawn off at the rate of 10 to 15 m/min. They were then stretched in two stages, first in boiling water in the ratio of 1 : 1.5 and then, after being washed in water at 60° C, they were finally stretched to a ratio of 1 : 3.5 at 350° C. The ultimate tensile strength of the stretched threads was 2.9 to 3.3 g/dtex at an elongation of 6 to 8%.

The moisture absorption capacity was determined as follows: The fibres were washed at 30° C, rapidly dried and exposed to an atmosphere of 20° C at 65% relative humidity for 24 hours for moisture absorption. The fibres were then dried in a vacuum at 80° C. The moisture absorption, which is given in percent of the weight of absolutely dry fibres, was 10.4%

COMPARISON EXAMPLE 1

This Example shows that when forming the copolymer described in Example 1, which consists mainly of poly-m-phenylisophthalamide, 3', 3''-diaminoisophthalic acid dilanilide of the following formula

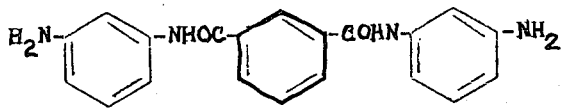

may well be used instead of m-phenylenediamine without substantially altering the water absorption capacity.

155.7 parts by weight of 3', 3''-diaminoisophthalic acid dianilide and 24.1 parts by weight of 3-(p-aminophenyl)-7-amino-2,4-(1H,3H)-quinazoline dione were introduced into 870 parts by weight of N-methylpyrrolidone, and 109.6 parts by weight of isophthalic acid dichloride were added in portions at 10° to 20° C in the course of about 2 hours. After neutralisation with 40 g of calcium hydroxide, the solution was spun, washed and stretched as described in Example 1. The ultimate tensile strength of the stretched threads was 4.0 to 4.3 g/dtex at 8 – 10% elongation. The moisture absorption capacity was found to be 10.0%.

EXAMPLES 2–4:

To prepare modified poly-m-phenylene-isophthalamide, 5,7 and 8 mols %, respectively, of 3-(p-aminophenyl)-7-amino-2,4-(1H,3H)-quinazoline dione (based on the total quantity of diamine) were copolycondensed as described in Example 1. The properties of the stretched threads are summarised in the following table.

| Example | Proportion of quinazoline dione diamine in mol % | Strength in g/dtex | Elongation | Moisture absorption in % |
|---|---|---|---|---|
| 2 | 5 | 2.7–2.9 | ca. 6 | 9.5 |
| 3 | 7 | 2.9–3.1 | 7 | 9.5 |
| 4 | 8 | 2.8–3.2 | 7 | 10.1 |

COMPARISON EXAMPLES 2–4:

These comparison Examples show that the moisture absorption capacity of modified poly-m-phenyleneisophthalamides which contain 20–40 mols % of units of the formula

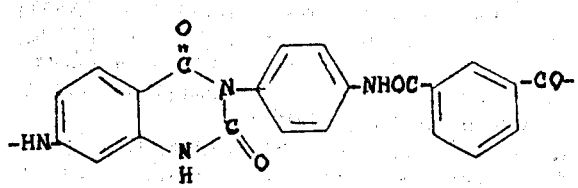

is not so high as that of the copolyamides described in Examples 2–4. The results of comparison Examples 2–4 are summarised in the following table:

| Comparison Example | Proportion of quinazoline dione amine in mol % | Strength in g/dtex | Elongation | Moisture absorption capacity in % |
|---|---|---|---|---|
| 2 | 20 | 3.5–3.8 | 7 | 8.2 |
| 3 | 30 | 4.2–4.7 | 5 | 8.6 |
| 4 | 40 | 3.8–4.3 | 7 | 8.1 |

Preparation of the copolyamide containing 30 mols % of quinazoline dione units (Comparison Example 3) is described below by way of example:

75.6 Parts by weight of m-phenylene diamine and 80.4 parts by weight of 3-(p-aminophenyl)-7-amino-2,4-(1H,3H)-quinazoline dione (30 mols % based on the total quantity of diamine) were introduced into 1080 parts by weight of absolute N-methylpyrrolidone. 203 Parts by weight of isophthalic acid dichloride were then added in portions at 0° to 5° C with constant stirring and the viscous solution was then stirred for several hours more at room temperature. In the meantime, a further 150 parts by weight of N-methylpyrrolidone were added to adjust the viscosity to about 2000 poises.

Since this copolyamide is soluble in N-methylpyrrolidone, it is not necessary to use a solubilising agent (e.g. calcium chloride). The hydrochloric acid formed in the condensation reaction may therefore be neutralised with 116 parts by weight of propylene oxide instead of with calcium hydroxide. The solution is spun and after-treated as in Example 1.

EXAMPLE 5

98.3 Parts by weight of m-phenylenediamine and 32.4 parts by weight of 3-[4'-(p-aminophenoxy)-phenyl]-7-amino-2,4-(1H,3H)-quinazoline dione were introduced into 990 parts by weight of N-methylpyrrolidone. The mixture was then cooled to about -30° C and 203 parts by weight of isophthalic acid dichloride were added in one portion. The viscous solution was stirred for several hours more at room temperature. The hydrochloric acid formed was neutralised with 74.1 parts by weight of calcium hydroxide. The resulting solution was spun and after-treated as described above. The stretched threads have an ultimate tensile strength of 2.5–3 g/dtex at an elongation of 10%. Their water absorption capacity is 9.1%.

EXAMPLE 6

98.3 Parts by weight of m-phenylenediamine and 24.1 parts by weight of 3-(p-aminophenyl)-6-amino-2,4-(1H,3H)-quinazoline dione were copolycondensed with 203 parts by weight of isophthalic acid dichloride as described in Example 1. The stretched threads have an ultimate tensile strength of 2.7 to 3.2 g/dtex and a moisture absorption capacity of 10.5%.

EXAMPLE 7

98.3 Parts by weight of m-phenylenediamine and 25.4 parts by weight of 1-methyl-3-(p-aminophenyl)-7-amino-2,4-(1H,3H)-quinazoline dione are copolycondensed with 203 parts by weight of isophthalic acid dichloride as described in detail in Example 1. Ultimate tensile strength of the stretched threads: 2.4 to 2.8 g/dtex (8% elongation), water absorption capacity: 10.6%.

We claim:
1. High molecular weight aromatic copolyamide consisting essentially of less than 15 mol percent of structural units which contain 2,4-(1H,3H)-quinazoline dione ring units having the formula

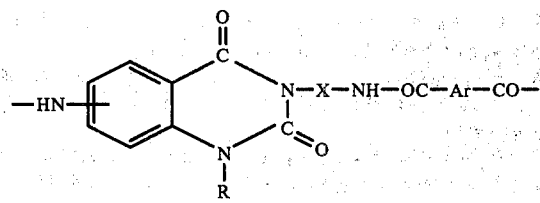

in which
R is hydrogen or $C_1$ to $C_4$ alkyl;
X is a divalent aromatic group which consists of one or more condensed rings or of several aromatic rings which are linked together by single bonds or by bridge members selected from the group consisting of —O—, —S—, —SO$_2$—

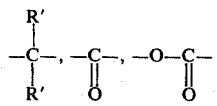

and —HN—SO$_2$; or the halogen, $C_1$ to $C_4$ alkyl, NO$_2$ or CN substitution products of said divalent aromatic group;
R' is R, cycloalkyl, or phenyl;
Ar is a divalent aromatic group which consists of one or more condensed or of several aromatic rings which are linked together by single bonds or by bridge members selected from the group consisting of —O—, —S—, —SO$_2$,

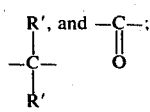

or the halogen, C$_1$ to C$_4$ alkyl, NO$_2$— or CN substitution products of said divalent aromatic group; and more than 85 mol percent of structural units of the formula $$—HN—Ar'—NH—OC—Ar—CO— \qquad (II)$$

in which
Ar has the meaning indicated above; and
Ar' has the meaning indicated for X;
said copolyamides having a relative solution viscosity (determined on a 0.5% solution of the copolyamide in concentrated sulphuric acid at 25° C) of 1.2 – 2.5; the copolyamides containing a mol percent of units sufficient to achieve a moisture absorption of at least 9% in a fiber prepared therefrom in which moisture absorption is measured by comparing moist fiber perpared by washing the fiber at 30° C., drying, exposure to an atmosphere of 20° C. and 65% relative humidity for 24 hours; and dry fiber dried in a vacuum at 80° C.

2. High molecular weight aromatic copolyamide of claim 1 in which X is

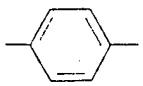

3. High molecular weight aromatic copolyamide of claim 1, in which Ar' is m- or p-phenylene.

4. High molecular weight aromatic copolyamide of claim 1 in which Ar in the formulae I and II is m- or p-phenylene.

5. High molecular weight aromatic polyamide of claim 1 in which Ar given in the formulae I and II is

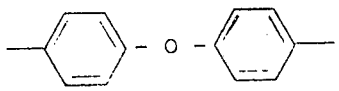

6. A fiber prepared from the high molecular weight copolyamide of claim 1.

7. High molecular weight copolyamide of claim 1 in which said structural units containing 2,4(1H,3H)-quinazoline dione rings comprise 5–12 mol percent of said copolyamide.

8. High molecular weight copolyamide of claim 1 in which said structural units containing 2,4(1H,3H)-quinazoline dione rings comprise 5–9.5 mol percent of said copolyamide.

9. High molecular weight copolyamide of claim 1 which contains a degree of crystallinity characteristic of the corresponding polyamide without 2,4(1H,3H)-quinazoline dione units, which crystallinity is detectable by X-ray wide angle diffraction.

10. High molecular weight copolyamide of claim 1 in which X is phenylene, substituted phenylene, or more than one phenylene or substituted phenylene linked together by single bonds or by bridge members selected from the group consisting of —O—, —S, —SO$_2$—,

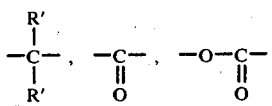

and —NH—SO$_2$—;
wherein said substituted phenylene is substituted with halogen, C$_1$ to C$_4$-alkyl, NO$_2$ or CN; and
Ar is naphthylene, phenylene, substituted phenylene, or more than one phenylene or substituted phenylene linked together by single bonds or by bridge members selected from the group consisting of —O—, —S—, —SO$_2$—,

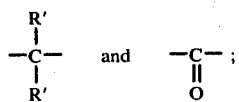

wherein said substituted phenylene is as defined above.

* * * * *